United States Patent Office 2,921,480
Patented Jan. 19, 1960

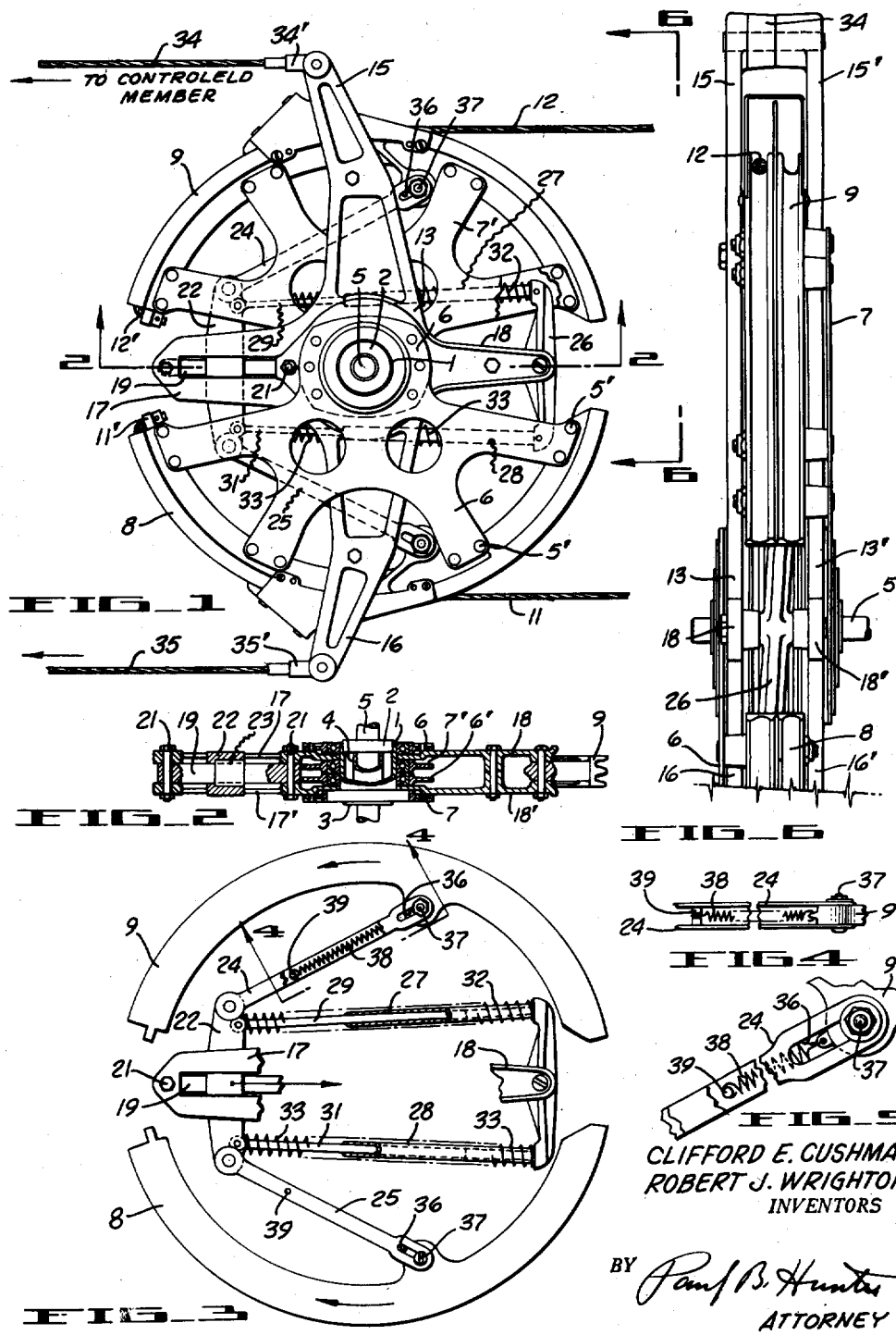

2,921,480

CONTROL LINE REGULATOR

Robert J. Wrighton, Tarzana, and Clifford E. Cushman, Burbank, Calif., assignors, by mesne assignments, to Pacific Scientific Company, San Francisco, Calif., a corporation of California Application January 30, 1956, Serial No. 562,073

9 Claims. (Cl. 74—501.5)

This invention relates in general to control line apparatus, and more particularly to control line regulators utilized for maintaining uniform tension in control lines extending between controlling and controlled points, the regulator acting automatically to compensate for variations in length of the lines resulting from such things as extreme temperature changes.

These tension regulators find their main use in modern aircraft where the flexing of air frames and operations in widely divergent temperature environments result in relatively rapid and pronounced variations in distance between control and controlling points. These regulators in common use consist of one or more compression or regulator springs, which exert a tension on the control lines or cables equal to the desired rig load of the cable system, plus an automatically locking mechanism which, although it allows the regulator spring forces to be exerted on the cables so long as the cables are under neutral or balanced forces, i.e., tension on the control cables are equal, to thereby maintain the desired rig loading, it locks up immediately upon a control force being applied to one of the control cables to prevent further tension regulating movement and to transmit the control force to the controlled point.

In these control regulators heretofore used it often happens that the control force applied to one of the cables is great enough to cause this cable to be stretched somewhat during the period the force is being applied. This causes undesired slack to be produced in the untensioned cable, resulting at times in the fouling of the control lines, which these prior art regulators were incapable of preventing. This and other drawbacks to the prior art devices will be explained more fully in the detailed description of this invention to follow.

It is, therefore, the principal object of the present invention to provide novel improved control line tension regulator devices which are fast-acting, dependable in operation, and maintain taut lines at all times.

One feature of the present invention is the provision of a novel control line regulator structure which operates to automatically take up slack in an associated control line during periods when the control line regulator is normally locked against control line tension regulation.

Another feature of the present invention is the provision of a novel spring structure for use in control line regulator devices for taking up slack in control lines occurring during periods when the regulator is locked.

Another feature of the present invention is the provision of a control line tension regulator device having spring means incorporated therein in addition to the normal tension regulator spring means for taking up slack in the control lines during the period when the regulator is normally locked against tension regulation.

Still another feature of the present invention is the provision of a novel rocker arm structure utilized in compensating for any unequal compression forces in the pair of mutually-opposed regulator springs found in one well-known form of canting-washer type control line tension regulator.

These and other features and advantages of the present invention will become more apparent from a perusal of the following specification taken in connection with the accompanying drawings wherein:

Fig. 1 is a plan view of one type of control line tension regulator device which embodies the present invention;

Fig. 2 is a view, mainly cross-sectional, of the apparatus shown in Fig. 1 taken along section line 2—2;

Fig. 3 is a plan view, similar to that of Fig. 1, showing only a portion of the novel regulator device to better illustrate the operation;

Fig. 4 is a fragmentary view of a portion of the device of Fig. 3 taken along section line 4—4;

Fig. 5 is a plan view of the structure shown in Fig. 4;

Fig. 6 is a side view of a portion of the regulator device taken along line 6—6 in Fig. 1.

Referring to Figs. 1 through 6, inclusive, there is shown one form of the novel control line compensating device or regulator of this invention. A description of the structure of this novel, improved device will first be given followed by an explanation of its operation.

A hollow cylindrical bearing mount member 1 has a pair of ball bearings 2 and 3 securely affixed in the open ends thereof, the bearings being spaced apart by a spacer tube 4. The axial opening through the ball bearings 2 and 3 and tube 4 provides the means for mounting this regulator device on a shaft 5 or the like. Rotatably mounted on the member 1, as by ball bearings, are two pairs of sector plates 6,6' and 7,7', sector plate pair 6, 6' having an arcuate-shaped shoe member 8 fixedly secured, as by rivets 5', between the outer peripheral edges thereof. A second arcuate shoe 9 is securely affixed between the other edges of sector plate pair 7, 7'. Each shoe 8, 9 is shown having a pair of cable grooves formed in the peripheral edges thereof, and, therefore, may accommodate one or two controlling cables each, it being assumed in this description that only one cable per shoe is provided. Controlling cable 11 is shown attached at 11′ at one end of one of the cable grooves in shoe 8, while shoe 9 carries controlling cable 12 attached at 12′.

Fixedly secured on the mount member 1 is a main frame member comprising a pair of driving arm members 13 and 13′, each arm member consisting of four extended arms; member 13 includes cable mounting arms 15 and 16, lock mounting arm 17, and rocker bar mounting arm 18, while member 13′ includes corresponding opposed arms 15′, 16′, 17′ and 18′, the driving arm members 13 and 13′ being mounted so that their corresponding arm extensions are all aligned one with the other.

A regulator lock shaft 19 is fixedly secured, as by bolts 21, between lock mounting arms 17 and 17′. Slidably mounted on lock shaft 19 is a transversely extending lock bar 22 having a locking washer or collar 23 secured in the bore thereof. Two pairs of flat connector links 24 and 25 couple the ends of the lock bar 22 to the two shoes 9 and 8, respectively. The two connector link assemblies are identical and only one, that including connector link pair 24, will be described. Each of the flat links 24 has slots 36 cut in one end thereof and is slidably coupled through the slots to the shoe 9 by a bolt 37. A tension spring 38 is located between the two flat links 24, one end of the spring being attached to the shoe 9 and the other end of the spring 38 being connected to a pin 39 which is fixedly secured in and extends between the two flat links 24. The other ends of link pair 24 are pivotally connected to one end of the lock bar 22.

Pivotally mounted between the ends of rocker bar mounting arms 18 and 18′ is a transversely extending rocker bar 26. A pair of tube members 27 and 28 are pivotally attached to the opposite ends of the rocker bar 26, these tube members cooperating in telescoping fashion with associated rods 29 and 31 which are pivotally attached to lock bar 22 near the opposite ends of this bar. A pair of compression type tension regulator springs 32 and 33 encircle the tubes 27, 28 and rods 29, 31 and are compressed between the ends of the lock bar 22 and rocker bar 26 to apply the desired rig load to the regulator.

A pair of controlled cables 34 and 35 are coupled by terminals 34' and 35', respectively, to the ends of arms 15, 15' and 16, 16' and extend to the mechanism which is to be controlled, for example, an elevator flap in an aircraft.

The operation of this improved regulator device will now be explained. The controlling cables 11 and 12 leading from the control point, such as a steering wheel or joy stick, will continually increase and decrease in length during use, mainly due, in aircraft use, to the extreme temperature changes to which the aircraft is subjected during flight and to air-frame flexure. This device operates, by opposite rotational movement of the shoes 8 and 9, to maintain the cables 11 and 12 at uniform tautness, these shoes locking, however, during the application of additional tension to one or the other of the cables 11 and 12 during control movements to transmit this control movement to the controlled cables 34 and 35. The shoes 8 and 9 are rotatably mounted on member 1 and are resiliently urged to move in opposite rotational directions by regulator springs 32 and 33, which exert, through lock bar 22 and connector links 24 and 25, a force on the shoes which tends to rotate them in the direction of the arrows shown on the shoes in Fig. 3 to maintain cable tension. If the tension in the cables 11 and 12 tends to increase, the shoes 8 and 9 to rotate in the reverse directions under the pull of the cables to maintain uniform cable tension. As the shoes 8 and 9 rotate back and forth in a mutually uniform manner to maintain this cable tension, the lock bar 22 slides back and forth along the lock shaft 19 and the rods 29 and 31 move out and in in telescoping manner within the tubes 27 and 28.

However, if a working force is applied to one or the other of cables 11, 12, for example, cable 11, which therefore tends to rotate its associated shoe 8, a force is exerted through the associated connector link 25 on the lock arm 22 which cants the arm 22 slightly on the lock shaft 19 since a like balancing force is not applied to the opposite end of the lock bar 22. The arm 22 is therefore jammed, through washer 23, on the shaft 19, and is prevented from sliding along the shaft 19. The shoes 8 and 9 and the driving arm members 13 and 13' are therefore locked together and all rotate as one unit to transmit the working force from the cable 11 to the cable 35, cable 35 moving to the right as viewed in Fig. 1. When the working force is removed from cable 11, the canting pull is removed from the lock bar 22, which then realigns itself for sliding movement on shaft 19, thus unlocking the shoes 8 and 9 for free cable-tensioning rotational movement.

In prior art devices, the rocker bar 26 was integral with the arm 18 and did not have a pivotal movement. The right-hand ends of the regulator springs 32 and 33 were therefore spatial fixed. Thus, if the two regulator springs 32 and 33 were not perfectly matched as to length and deflection under rig load forces there was a tendency for one spring to exert a slightly greater force on its associated end of lock bar 22 than the other spring, resulting in a slight canting of the lock bar and, therefore, an undesired braking or locking force on the lock shaft 19.

By having the bar 26 pivotally mounted, this novel regulator device prevents any tendency for unsymmetrical or unmatched regulator springs to cant the lock bar 22. If the spring force of one regulator spring is greater than the other, the rocker bar 26 will rock or cant until the slight difference in spring force is balanced, thus eliminating the tendency to improperly cant the lock bar 22.

Also, in prior art devices, the connector links 24 and 25 were solid, unyielding links extending between the shoes 9 and 8 and the lock bar 22. In such prior art devices, when a heavy working tension was placed on one of the cables, cable 11 for example, the regulator device locked, as above explained, and both shoes 8 and 9 rotated in the same direction. Thus, the unloaded cable, in this example cable 12, was taken up by the shoe 9. However, in addition to moving the cable 11, the heavy working tension also stretched it slightly, the length of stretch being dependent on the amount of force exerted and the original length of the cable 11. This created undesired slack in the untensioned cable 12 which was not taken up by the rotation of shoe 9. The novel regulator device disclosed herein, through its improved connector link structures, takes up this additional slack in the untensioned controlling cable in the following manner.

Normal tensions on the cables 11 and 12 exert a rotational force on the shoes which is counteracted by the force of regulator springs 32 and 33 acting on the shoes 9 and 8 through the connector links 24 and 25. The normal tensions on the cables 11 and 12 load the shoes 8 and 9 so that the bolts 37 which couple the links 25 and 24 to the shoes 8 and 9 bear against the outer or right-hand ends of the slots 36 as shown in Figs. 3, 4, and 5. In the event of heavy loads on one cable, say cable 11, resulting in slack in the other cable 12, the tension spring 38 associated with the slack shoe 9 pulls on and thus rotates the shoe 9 enough to take up this additional slack in cable 12, the bolt 37 sliding within the slot 36.

Thus, the slack take-up springs 38 maintain positive tension in the controlling cables throughout their working length. The maximum force exerted on the controlling cable by the springs 38 must be always less than the lowest possible force exerted by the regulator springs 32 and 33. This is necessary to insure that the bolts 37 remain against the outer or right-hand ends of the slots 36 at all times, except under the slack condition described immediately above. If this is not done, lost motion will result when the control loads are applied.

Since many changes could be made in the above construction of the control line regulator and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control line tension regulator comprising a pair of arcuate members, means for mounting said members for relative arcuate movement, means for securing a control line to each of said members in a manner whereby the members will move in opposite control line play-out directions when the lines are both pulled, spring means resiliently urging said members to move in opposite control line take-up directions for tensioning both of the control lines, means for automatically holding said members against relative movement in a control line play-out direction when one of said control lines is under a tension substantially greater than the other, and means coupled to said arcuate members for urging said arcuate members in a control line take-up direction during said locked condition whereby the arcuate member associated with said other control line may move relative to the other arcuate member to take up any slack which may be produced in said other control line.

2. A control line tension regulator device as claimed in claim 1 wherein said last named means comprises a pair of tension springs, one coupled to each arcuate member.

3. A control line tension regulator comprising a pair of arcuate members, means for mounting said members for relative arcuate movement, means for securing a control line to each of said members in a manner whereby the members will move in opposite control line play-out directions when the lines are both pulled, locking means including a lock bar coupled to said mounting means, a pair of linkage means coupling said lock bar to said arcuate members, a pair of regulator springs coupled to said lock bar for resiliently urging said arcuate members, through said linkage means, in a control line take-up direction to maintain a uniform tension in said control lines, said lock bar locking up when the tension in one of said control lines substantially exceeds the tension in the other line, and spring means associated with each linkage means urging said arcuate member to move relative to said linkage means and said lock bar in a direction to take up the associated control line whereby any slack created in the untensioned control line may be taken up by said associated arcuate member during the locked condition of the regulator device.

4. A control line tension regulator as claimed in claim 3 wherein each of said linkage means comprises a pair of link members, one end of each member being pivotally mounted to the lock bar, the other end of each link member having a slot therein, said link members being slidably coupled to the associated arcuate member through the slots, and wherein said spring means comprises a tension spring coupled at one end to said link members and at the other end to said arcuate member, said spring tending to pull said arcuate member along the slot toward said lock bar in the control line take-up direction.

5. A control line tension regulator comprising a main frame member, a pair of arcuate members rotatably mounted on said main frame member for relative arcuate movement, means for securing a control line to each of said arcuate members in a manner whereby the members will move in opposite control line play-out directions when the lines are both uniformly pulled, a locking rod mounted on said main frame member, a locking bar slidably mounted transversely on said locking rod, linkage means coupling opposite sides of said lock bar to different ones of said arcuate members, a rocker bar pivotally mounted at its center point on said main frame member and extending substantially parallel to said lock bar, and compression springs secured between opposite sides of the lock bar and the associated opposite sides of said rocker bar for resiliently urging said lock bar to slide on said lock rod and thereby urge, through said linkage means, said arcuate members to rotate in a control line tensioning direction, said rocker arm pivoting, when necessary, to balance the tension forces of said regulator springs on said lock bar.

6. A control line tension regulator comprising a main frame member, a pair of arcuate members rotatably mounted on said main frame member for relative arcuate movement, means for securing a control line to each of said arcuate members in a manner whereby the members will move in opposite control line play-out directions when the lines are both uniformly pulled, a locking rod mounted on said main frame member, a locking bar slidably mounted transversely on said locking rod, a pair of linkage means coupling opposite sides of said lock bar to different ones of said arcuate members, a rocker bar pivotally mounted at its center point on said main frame member and extending substantially parallel to said lock bar, and a pair of compression springs respectively secured between each opposite side of the lock bar and the associated opposite ends of said rocker bar for resiliently urging said lock bar to slide on said lock rod and thereby urge, through said linkage means, said arcuate members to rotate in a control line take-up direction to maintain a uniform tension in said control lines, said rocker arm pivoting, when necessary, to balance the tension forces of said regulator springs on said lock bar, said lock bar canting on said lock rod to prevent further sliding movement thereon when the tension in one of said control lines exceeds the tension in the other line, thus locking said arcuate members against further rotational movement in the control line play-out direction, each of said linkage means comprising spring means coupled to the associated arcuate member for urging said member to rotate relative to said linkage means and said lock bar in a direction to take up any slack created in the untensioned control line.

7. A control line tension regulator as claimed in claim 6 wherein each of said linkage means comprises a pair of link members, one end of each member being pivotally mounted to the lock bar, the other end of each link member having a slot therein, said link members being slidably coupled to the associated arcuate member through the slots, and a tension spring coupled at one end to said link members and at its other end to said arcuate member, said spring tending to pull said arcuate member along the slot toward said lock bar in the control line take-up direction.

8. A control line tension regulator comprising a main frame member, a pair of arcuate members rotatably mounted on said main frame member for relative arcuate movement, means for securing a control line to each of said arcuate members in a manner whereby the members will move in opposite control line play-out directions when the lines are both uniformly pulled, a locking rod mounted on said main frame member, a locking bar slidably mounted transversely on said locking rod, a pair of linkage means coupling opposite sides of said lock bar to different ones of said arcuate members, a rocker bar pivotally mounted at its center point on said main frame member and extending substantially parallel to said lock bar, a pair of compression springs respectively secured between each opposite side of the lock bar and the associated opposite ends of said rocker bar for resiliently urging said lock bar to slide on said lock rod and thereby urge, through said linkage means, said arcuate members to rotate in a control line tensioning direction, said rocker arm pivoting, when necessary, to balance the tension forces of said regulator springs on said lock bar, and spring means associated with each linkage means urging said arcuate member to move relative to said linkage means and said locking bar in a direction to take up the associated control line whereby any slack created in the untensioned control line may be taken up by the associated arcuate member during the locked condition of the regulator device.

9. A control line tension regulator as claimed in claim 8 wherein each of said linkage means comprises a pair of link members, one end of each member being pivotally mounted to the lock bar, the other end of each link member having a slot therein, said link members being slidably coupled to the associated arcuate member through the slots, and wherein said spring means comprises a tension spring coupled at one end to said link members and at the other end to said arcuate member, said spring tending to pull said arcuate member along the slot toward said lock bar in the control line take-up direction.

References Cited in the file of this patent

UNITED STATES PATENTS

| Re. 23,933 | Cushman | Feb. 1, 1955 |
| 2,280,106 | Sturgess | Apr. 21, 1942 |
| 2,327,021 | Cushman | Aug. 17, 1943 |
| 2,375,050 | Tauscher | May 1, 1945 |
| 2,399,793 | Cushman | May 7, 1946 |
| 2,424,198 | Tauscher | July 15, 1947 |
| 2,787,916 | Cushman | Apr. 9, 1957 |
| 2,810,300 | Pigford | Oct. 22, 1957 |